(12) United States Patent
Zhang et al.

(10) Patent No.: US 11,489,681 B2
(45) Date of Patent: Nov. 1, 2022

(54) MULTIFUNCTIONAL PHYSICALLY UNCLONABLE FUNCTION DEVICE BASED ON HYBRID BOOLEAN NETWORK

(71) Applicant: Taiyuan University of Technology, Taiyuan (CN)

(72) Inventors: Jianguo Zhang, Taiyuan (CN); Xin Wang, Taiyuan (CN); Guodong Zhang, Taiyuan (CN); Yuncai Wang, Taiyuan (CN); Pu Li, Taiyuan (CN); Xianglian Liu, Taiyuan (CN)

(73) Assignee: Taiyuan University of Technology, Taiyuan (CN)

( * ) Notice: Subject to any disclaimer, the term of this patent is extended or adjusted under 35 U.S.C. 154(b) by 0 days.

(21) Appl. No.: 17/412,852

(22) Filed: Aug. 26, 2021

(65) Prior Publication Data

US 2022/0094561 A1 Mar. 24, 2022

(30) Foreign Application Priority Data

Sep. 21, 2020 (CN) .......................... 202010994384.9

(51) Int. Cl.
*H04L 9/32* (2006.01)
(52) U.S. Cl.
CPC ........ *H04L 9/3278* (2013.01); *H04L 2209/12* (2013.01)

(58) Field of Classification Search
CPC ... H04L 9/3278; H04L 2209/12; G06F 7/588; G06F 21/72
See application file for complete search history.

(56) References Cited

FOREIGN PATENT DOCUMENTS

WO   WO-2020247059 A1 * 12/2020 ........... H04L 9/3278

OTHER PUBLICATIONS

Canaday et al., Transient Response of Hybrid Boolean Networks as Physical Unclonable Functions, Jul. 29, 2019, Ohio State University, Department of Physics, pp. 1-15, (Year: 2019).*

* cited by examiner

*Primary Examiner* — Ellen Tran
(74) *Attorney, Agent, or Firm* — Greenberg Traurig, LLP

(57) ABSTRACT

A physically unclonable function (PUF) device includes a hybrid Boolean network module of a ring of N number of Boolean nodes connected end to end and a sampling module, wherein the hybrid Boolean network module comprises N number of xor logic gates and corresponding N number of multiplexers, wherein a function change module is disposed between an output end of a first xor logic gate of the N number of xor logic gates and an input end of a first multiplexer of the N number of multiplexers, wherein each Boolean node is provided with four input ends and three output ends, the four input ends respectively connected to an output end of each of two juxtaposing Boolean nodes, an initial excitation signal and a control delay signal, the three output ends respectively output to an input of each of two juxtaposing Boolean nodes, and the sampling module.

7 Claims, 5 Drawing Sheets

| Statistical test | P-value | Proportion | Result |
|---|---|---|---|
| Frequency | 0.886162 | 0.985 | Success |
| Block frequency | 0.544254 | 0.983 | Success |
| Cumulative sums* | 0.673298 | 0.988 | Success |
| Runs | 0.152044 | 0.993 | Success |
| Longest run | 0.375313 | 0.990 | Success |
| Rank | 0.991468 | 0.990 | Success |
| FFT | 0.645448 | 0.982 | Success |
| Nonoverlapping template* | 0.488252 | 0.992 | Success |
| Overlapping template | 0.854708 | 0.989 | Success |
| Universal | 0.102526 | 0.983 | Success |
| Approximate entropy | 0.178604 | 0.994 | Success |
| Random excursions* | 0.751699 | 0.989 | Success |
| Random excursions variant* | 0.349742 | 0.991 | Success |
| Serial* | 0.485820 | 0.989 | Success |
| Linear complexity | 0.655854 | 0.990 | Success |

FIG. 5

MULTIFUNCTIONAL PHYSICALLY UNCLONABLE FUNCTION DEVICE BASED ON HYBRID BOOLEAN NETWORK

CROSS REFERENCE TO RELATED APPLICATION(S)

This patent application claims the benefit and priority of Chinese Patent Application No. 202010994384.9, filed on Sep. 21, 2020, the disclosure of which is incorporated by reference herein in its entirety as part of the present application.

TECHNICAL FIELD

The present disclosure relates to the field of design of physically unclonable function (PUF) devices, and particularly relates to a multifunctional PUF device based on a hybrid Boolean network.

BACKGROUND ART

With the rapid development of a communication technology and a cloud technology, people's demand for information security and privacy protection continues to increase. Creation, storage and distribution of encryption keys are still research hotspots at the present. Modern cryptographic protocols stipulate that only authorized participants can obtain a key and a permission to access information. However, an attacker usually uses various attack methods to crack the key, making it difficult for information security to be adequately ensured. In order to solve such problems, a physically unclonable function (PUF) came into being.

The PUF uses inevitable small random changes of a process in a production and manufacturing process to generate a unique and stable response. The PUF has reliability, uniqueness, unclonability, and unpredictability. It can generate security keys "dynamically" and store them in physical parameters of a circuit itself, so that the attacker hardly extracts key information therefrom or tampers the key information. These characteristics are enough to meet the security requirement in the security field.

At present, a relatively common PUF is based on a ring oscillator. It takes advantage of delay characteristics of silicon in the circuit and differences in various non-ideal conditions (such as noise and temperature) in actual operation, so that the same excitation will generate outputs of different frequencies in different oscillation rings. After a certain time interval, a comparator compares the number of oscillations of output signals of the oscillation rings to randomly output a binary number. However, the structural characteristics of the PUF based on the ring oscillator determine its inevitable defects: if more output bits are to be generated, the designer can only increase the number of oscillation rings continuously, which also leads to consumption of more chip resources.

SUMMARY

The present disclosure aims to provide a multifunctional physically unclonable function (PUF) device based on a hybrid Boolean network. A multifunctional PUF structure is created by virtue of the characteristics of an autonomous Boolean network. Plentiful enough excitation-response pairs can be generated only by occupying a few of field programmable gate arrays (FPGA) to realize functions of the PUF. The structure can also be used as a physical random number generator.

To achieve the above-mentioned purpose, the present disclosure provides the following solution.

A multifunctional physically unclonable function (PUF) device based on a hybrid Boolean network includes a hybrid Boolean network module of a ring topological structure formed by connecting N number of Boolean nodes end to end and a sampling module, wherein the hybrid Boolean network module comprises N number of xor logic gates and corresponding N number of multiplexers, wherein a function change module is disposed between an output end of a first xor logic gate of the N number of xor logic gates and an input end of a first multiplexer of the N number of multiplexers, the function change module configured to switch the multifunctional PUF device to perform either a PUF function or a true random number generator function, wherein each Boolean node of the N number of Boolean nodes is provided with four input ends and three output ends, the four input ends respectively connected to an output end of each of two juxtaposing Boolean nodes of the N number of Boolean nodes, an initial excitation signal and a control delay signal wherein the control delay signal is obtained by processing a control signal by a control delay module, the three output ends respectively output to an input end of each of two juxtaposing Boolean nodes of the N number of Boolean nodes, and the sampling module.

Optionally, the function change module includes an inverter and a multiplexer; an output of the first xor logic gate is divided into two paths; one path is directly connected to one input end of the multiplexer, and the other path is connected to one input end of the multiplexer after being processed by the inverter; and an output of the multiplexer is connected to one input end of the first multiplexer. A function change signal of the multiplexer controls whether to negate the output of the first xor logic gate; the true random number generator function is realized when the function change signal controls the output of the first xor logic gate to be negated; the PUF function is realized when the function change signal controls the output of the first xor logic gate to be not negated; and the first multiplexer is the first one in the multiplexers.

Optionally, in the N Boolean nodes, N is an integer which is a multiple of 3, N >8.

Optionally, the control delay module includes S serially connected inverters, and S is an even integer, 10≤S≤20.

Optionally, the sampling module samples and quantifies outputs of the N Boolean nodes by means of an external clock signal to obtain an N-bit binary character string output.

Optionally, the external clock signal is ≤200 MHz.

Optionally, the sampling module includes a D flip-flop and an external clock signal unit.

According to the specific embodiments provided by the present disclosure, the present disclosure discloses the following technical effects.

1. The multifunctional PUF device based on the hybrid Boolean network of the present disclosure is of a novel PUF structure; the excitation-response pair increases exponentially with the number N of nodes. Plentiful enough excitation-response pairs can be obtained by adding a few of nodes. Chip resources are greatly saved during integration in chips.

2. The whole multifunctional PUF device based on the hybrid Boolean network of the present disclosure is composed of simple logic devices, so that it is easy to realize on electronic devices such as programmable logic devices (PLDs), field programmable gate arrays (FPGAs), and complex programmable logic devices (CPLDs).

3. The multifunctional PUF device based on the hybrid Boolean network of the present disclosure can realize mutual change between the PUF function and the true random number generator function.

BRIEF DESCRIPTION OF THE DRAWINGS

In order to describe the embodiments of the present disclosure or technical solutions in the existing art more clearly, drawings required to be used in the embodiments will be briefly introduced below. Apparently, the drawings in the descriptions below are only some embodiments of the present disclosure. Those ordinarily skilled in the art also can acquire other drawings according to these drawings without creative work.

FIG. 5 is a schematic diagram of NIST statistical tests result of a random number generated during realization of a true random number generator function of 9 nodes.

DETAILED DESCRIPTION OF THE EMBODIMENTS

The technical solutions in the embodiments of the present disclosure will be clearly and completely described below in conjunction with the accompanying drawings in the embodiments of the present disclosure. Apparently, the described embodiments are only a part of the embodiments of the present disclosure, rather than all the embodiments. Based on the embodiments in the present disclosure, all other embodiments obtained by those of ordinary skill in the art without creative work shall fall within the protection scope of the present disclosure.

In order to make the above-mentioned purposes, characteristics and advantages of the present disclosure more obvious and understandable, the present disclosure is further described in detail below with reference to the accompanying drawings and specific implementation modes.

The autonomous Boolean network is of a two-way topological ring structure. Oscillation is triggered by an output of a Boolean node that performs an exclusive-or-not (NXOR) logic operation, and the remaining Boolean nodes perform an exclusive-or (XOR) logic operation. Due to the non-ideal nature of a logic gate, there is a random delay in the transmission between the respective logic gates, so that an output result of the Boolean network is unpredictable and difficult to replicate. A cumulative effect of the network makes the output result very sensitive to tiny differences in initial conditions. A novel physically unclonable function (PUF) can be created by using these characteristics of the autonomous Boolean network, and the PUF of this type of structure is all composed of digital logic devices, so that the structure is simple and easy to integrate, and is easy to implement in an FPGA.

Figure 1:
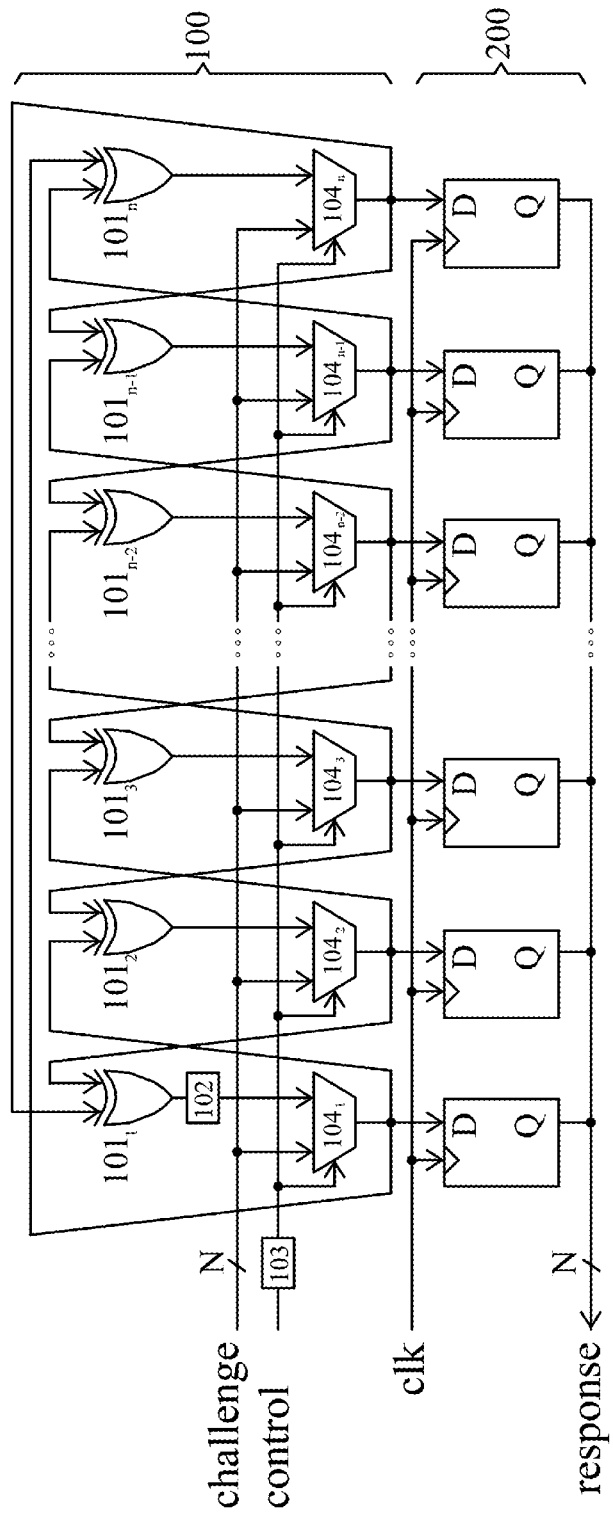
FIG. 1 is a circuit structural diagram of a multifunctional physically unclonable function (PUF) device based on a hybrid Boolean network.

As shown in FIG. 1, a multifunctional physically unclonable function (PUF) device based on a hybrid Boolean network includes a hybrid Boolean network module 100 of a ring topological structure formed by connecting N Boolean nodes end to end, and a sampling module 200. The hybrid Boolean network module 100 includes N xor logic gates 101 and N multiplexers 104. An output end of the first xor logic gate 101 is provided with a function change module 102 used to realize mutual change between a PUF function and a true random number generator function. In the hybrid Boolean network module 100, each Boolean node is provided with four input ends and three output ends. The four input ends are respectively composed of outputs of two Boolean nodes on the left and right of one Boolean node, an initial excitation and a control delay signal. The control delay signal is obtained by processing a control signal by a control delay module 103. The three output ends respectively output to the input ends of two Boolean nodes on the left and right of the current Boolean node, and the other output end outputs a signal to the sampling module 200. It can be seen in combination with FIG. 1 that the outputs of two adjacent Boolean nodes are processed by the xor logic gates 101, and then are input into the multiplexers 104 together with an initial excitation signal and the control delay signal. An output of each Boolean node is obtained by using the control delay signal. Two outputs in the three output ends are respectively used as one input signal for the two Boolean nodes on the left and right of the Boolean node and are input to the xor logic gate 101, and the remaining output end is used as an output of a Boolean node operation result. That is, each Boolean node is composed of one xor logic gate 101 and one multiplexer 104. Each Boolean node has four input ends and three output ends: the two input ends of the xor logic gate $101_1$ are respectively connected to the output ends of the two multiplexer $104_2$ and $104_N$; the two remaining input ends are respectively an initial excitation signal and a control delay signal which are connected to the multiplexer $104_1$ together with the output of the xor logic gate $101_1$; the output end of the multiplexer $104_1$ is connected to one input end of each of the xor logic gates $101_2$ and $101_N$; two input ends of the xor logic gate $101_2$ are respectively connected to the output ends of the two multiplexer $104_1$ and $104_3$, and the two remaining input ends are respectively an initial excitation signal and a control delay signal which are connected to the multiplexer $104_2$ together with the output of the xor logic gate $101_2$; and the output of the multiplexer $104_2$ is then connected to one input end of each of the xor logic gate $101_1$ and $101_3$. A hybrid Boolean network structure is formed by this connection method.

Figure 2:
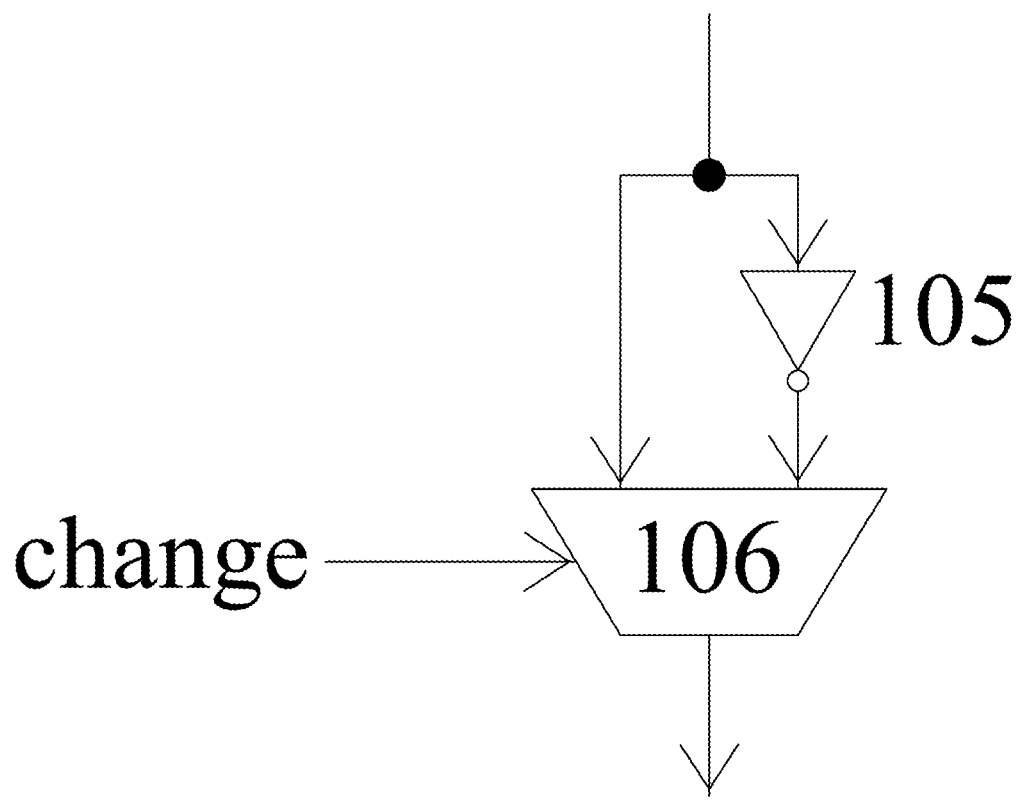
FIG. 2 is a circuit structural diagram of a function change module in the device of the present disclosure.

As shown in FIG. 2, the function change module 102 includes an inverter 105 and a multiplexer 106. One function change module 102 is added at the output end of the xor logic gate $101_1$, so that mutual change between the PUF function and the true random number generator function can be realized. The function change module is mainly composed of an inverter 105 and a multiplexer 106. An output of the xor logic gate $101_1$ is divided into two paths: one path is directly connected to one input end of the multiplexer 106, and the other path is processed by the inverter 105 and is then connected to one input end of the multiplexer 106. An output of the multiplexer 106 is connected to one input end of the multiplexer $104_1$. The function change signal (change) of the multiplexer 106 controls whether to negate the output of the xor logic gate $101_1$; the true random number generator function is realized when the function change signal controls the output of the first xor logic gate $101_1$ to be negated; and the PUF function is realized when the function change signal controls the output of the first xor logic gate $101_1$ to be not negated.

In the N Boolean nodes, N is an integer which is a multiple of 3, N>8.

Figure 3:
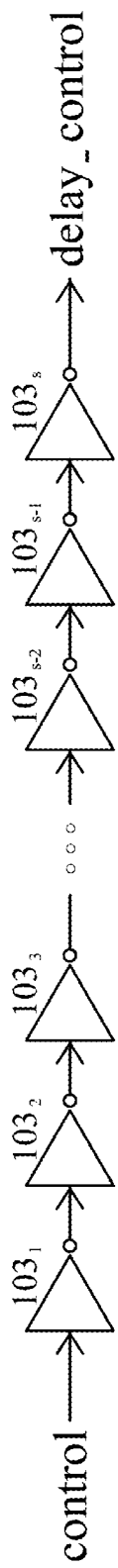
FIG. 3 is a circuit structural diagram of a control delay module in the device of the present disclosure.

As shown in FIG. 3, the control delay module 103 includes S serially connected inverters, and S is an even integer, 10≤S≤20.

The sampling module 200 includes a D flip-flop and an external clock signal unit. The sampling module 200 is realized by the D flip-flop; N output signals generated by the N Boolean nodes are transmitted to the D flip-flop and are sampled and quantified by the external clock signal unit to obtain an N-bit binary character string output, i.e., an operation result of the Boolean network. The external clock signal is 200 MHz.

When the PUF function is realized, excitation is realized by inputting an initial excitation signal (challenge) to a network. The initial excitation signal is an N-bit binary character string. The control signal (control) is inverted from 1 to 0, the multiplexer 104 gates the initial excitation signal, and the Boolean network evolves from an initial state (initial excitation signal). After time τ (0 to 5 ns), the D flip-flop reads the state of the entire network, which is an N-bit output after PUF operation. Since the output of each Boolean node is determined by the input initial excitation signal and the physical characteristics of a logic device itself, and is not driven by an external clock signal, an output result is unpredictable. There are tiny random differences in a process of each logic device, and it is difficult for manufacturers to achieve identical PUFs. There is an accumulating random propagation delay in the network. Even if part of the input is known, it is difficult to predict its output. The PUF with such a structure has extremely high security.

The PUF is characterized by the number N of nodes and time τ. τ needs to be kept within a minimum range allowed by a global clock of the FPGA, which is affected by the structure of the PUF and the number of nodes. It should be noted that the actual reading time may be reduced.

An effective initial state set of the PUF includes all possible binary character strings with a length of N, and their outputs after the PUF operation will not enter a periodic state. For all the Ns, an all 0 state or an all 1 state must be excluded. For an even number N, alternate use of 0 and 1 also must be excluded. Therefore, the number of effective excitation-response pairs is:

$$N_{vc} = \begin{cases} 2^N - 2, & N_{odd} \\ 2^N - 4, & N_{even} \end{cases}$$

However, in either case, it can be seen from the above formula that the excitation-response pair of the PUF increases exponentially with the number N of Boolean nodes. In other words, the number of unpredictable excitation-response pairs can be greatly increased by adding a few of Boolean nodes.

When the true random number generator function is realized, an xor logic function is realized through a NOT gate gated by the xor logic gate $101_1$ and the function change module, so that the Boolean network can generate self-excited oscillation. The control signal (control) is inverted from 0 to 1, the multiplexer 104 gates the output signal of the function change module 102, and the Boolean network starts the self-excited oscillation. After the time τ (0 to 5 ns), the D flip-flop reads the state of the entire network, which is an N-bit random number generated by a true random number generator. The N-bit random number generated by this structure can succeed in the international random number industry test standard (NIST statistical test packet) without post-processing.

The multifunctional PUF structure based on the hybrid Boolean network is realized by a simple digital logic device, which can be implemented in various programmable integrated circuits and has universal applicability.

The FPGA verifies the feasibility of the multifunctional PUF structure based on the hybrid Boolean network, and a multifunctional PUF structure with N=9 is realized.

Figure 4:
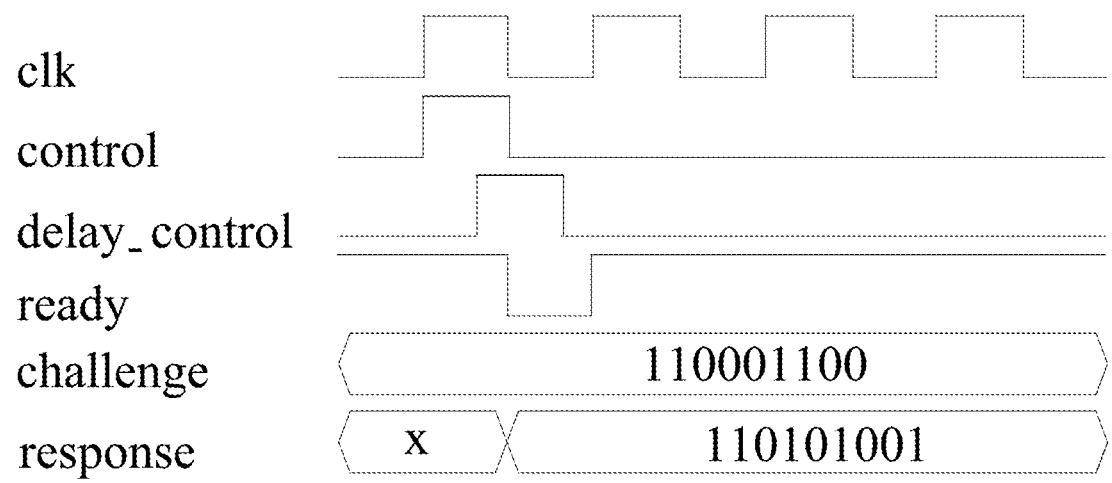
FIG. 4 is a schematic diagram of experimental results during realization of a PUF of 9 nodes.

FIG. 4 is a schematic diagram of experimental results during realization of a PUF of 9 nodes. In FIG. 4, clk is a clock signal; control is a control signal; delay_control is a control delay signal; ready is a response output ready signal; challenge is an initial excitation signal; and response is a PUF output response signal.

When the PUF function is realized, a 9-bit binary number (110001100) is used as an excitation signal and is input into the PUF. The state of the Boolean network after 5 ns is used as a response to the PUF, so that an excitation-response pair is realized. The response is stored in a memory of the FPGA by means of a clock signal with a clock frequency of 100 MHz, so that an output of the PUF is obtained.

FIG. 5 is a schematic diagram of an NIST random number test result of a random number generated during realization of a true random number generator function of 9 nodes.

1000 groups of true random number sequences with capacity of 1 Gbit are collected for NIST test. The significance level is 0.01. The p-value of each test is required to be greater than 0.0001, and a proportion value is greater than 0.9806. FIG. 5 illustrates an NIST test result, which indicates that random numbers generated by this structure can succeed in the NIST test and show good randomness.

From the above discussion, it can be seen that the multifunctional PUF structure based on the hybrid Boolean network provided by the present disclosure is actually achievable and can be implemented on a programmable integrated circuit such as the FPGA. The multifunctional PUF structure has simple structure and extremely high compatibility. Moreover, operation results of the realized PUF function are completely determined by initial excitation and the physical characteristics of a logic device itself, which is unreproducible and unpredictable; the random numbers output by the realized random number generator function has good randomness, and can succeed in the international random number industry test standard (NIST statistical test packet).

Compared with a PUF structure based on a hybrid autonomous Boolean network and other PUF structures, the present disclosure has the following advantages.

1. The multifunctional PUF device based on the hybrid Boolean network of the present disclosure is of a novel PUF structure; the excitation-response pair increases exponentially with the number N of nodes. Plentiful enough excitation-response pairs can be obtained by adding a few of nodes. Chip resources are greatly saved during integration in chips.

2. The whole multifunctional PUF device based on the hybrid Boolean network of the present disclosure is composed of simple logic devices, so that it is easy to realize on electronic devices such as programmable logic devices (PLDs), field programmable gate arrays (FPGAs), and complex programmable logic devices (CPLDs).

3. The multifunctional PUF device based on the hybrid Boolean network of the present disclosure can realize mutual change between the PUF function and the true random number generator function.

All the embodiments in the specification are described in a progressive manner. Contents mainly described in each embodiment are different from those described in other embodiments. Same or similar parts of all the embodiments refer to each other.

The principle and implementation modes of the present disclosure are described by applying specific examples herein. The descriptions of the above embodiments are only intended to help to understand the device of the present disclosure and a core idea of the device. In addition, those ordinarily skilled in the art can make changes to the specific implementation modes and the application scope according to the idea of the present disclosure. From the above, the contents of the specification shall not be deemed as limitations to the present disclosure.

What is claimed is:

1. A multifunctional physically unclonable function (PUF) device based on a hybrid Boolean network, the multifunctional PUF device comprising:
    a hybrid Boolean network module of a ring topological structure formed by connecting N number of Boolean nodes end to end; and
    a sampling module,
    wherein the hybrid Boolean network module comprises N number of xor logic gates and corresponding N number of multiplexers, wherein a function change module is disposed between an output end of a first xor logic gate of the N number of xor logic gates and an input end of a first multiplexer of the N number of multiplexers, the function change module configured to switch the multifunctional PUF device to perform either a PUF function or a true random number generator function;
    wherein each Boolean node of the N number of Boolean nodes is provided with four input ends and three output ends, the four input ends respectively connected to an output end of each of two juxtaposing Boolean nodes of the N number of Boolean nodes, an initial excitation signal and a control delay signal wherein the control delay signal is obtained by processing a control signal by a control delay module, the three output ends respectively output to an input end of each of two juxtaposing Boolean nodes of the N number of Boolean nodes, and the sampling module.

2. The multifunctional PUF device according to claim 1, wherein the function change module comprises an inverter and a second multiplexer, wherein an output of the first xor logic gate is divided into two paths, one path is directly connected to one input end of the second multiplexer and the other path is connected to another input end of the second multiplexer after being processed by the inverter; an output of the second multiplexer is connected to an input end of the first multiplexer; a function change signal provided to the second multiplexer controls whether to negate the output of the first xor logic gate; the true random number generator function is realized when the function change signal controls the output of the first xor logic gate to be negated; the PUF function is realized when the function change signal controls the output of the first xor logic gate not to be negated.

3. The multifunctional PUF device according to claim 1, wherein N is an integer which is a multiple of 3, and N>8.

4. The multifunctional PUF device according to claim 1, wherein the control delay module comprises S number of serially connected inverters, and S is an even integer, $10 \leq S \leq 20$.

5. The multifunctional PUF device according to claim 1, wherein the sampling module samples and quantifies outputs of the N number of Boolean nodes by means of an external clock signal to obtain an N-bit binary character string output.

6. The multifunctional PUF device according to claim 5, wherein the external clock signal is $\leq 200$ MHz.

7. The multifunctional PUF device according to claim 1, wherein the sampling module comprises a D flip-flop and an external clock signal unit.

* * * * *